US012157946B2

(12) United States Patent
Borin et al.

(10) Patent No.: US 12,157,946 B2
(45) Date of Patent: Dec. 3, 2024

(54) AUTOMATED CATHODIC PROTECTION MEASUREMENT AND COMMUNICATION SYSTEM AND METHOD

(71) Applicants: Frank William Borin, Culver City, CA (US); Thomas Theissen, Marina Del Rey, CA (US)

(72) Inventors: Frank William Borin, Culver City, CA (US); Thomas Theissen, Marina Del Rey, CA (US)

(73) Assignee: BORIN MANUFACTURING, INC., Culver City, CA (US)

( * ) Notice: Subject to any disclaimer, the term of this patent is extended or adjusted under 35 U.S.C. 154(b) by 657 days.

(21) Appl. No.: 17/035,503

(22) Filed: Sep. 28, 2020

(65) Prior Publication Data

US 2021/0095380 A1 Apr. 1, 2021

Related U.S. Application Data

(60) Provisional application No. 62/907,511, filed on Sep. 27, 2019.

(51) Int. Cl.

| | |
|---|---|
| ***C23F 13/04*** | (2006.01) |
| ***C23F 13/22*** | (2006.01) |
| ***G08C 19/02*** | (2006.01) |
| ***H01Q 1/24*** | (2006.01) |
| ***H01Q 11/08*** | (2006.01) |

(52) U.S. Cl.

CPC .............. *C23F 13/04* (2013.01); *C23F 13/22* (2013.01); *G08C 19/02* (2013.01); *H01Q 1/242* (2013.01); *H01Q 11/08* (2013.01)

(58) Field of Classification Search

CPC ...... C23F 13/04; C23F 13/22; C23F 2213/10; G01N 17/02

See application file for complete search history.

(56) References Cited

U.S. PATENT DOCUMENTS

| | | | | |
|---|---|---|---|---|
| 3,055,970 A * | 9/1962 | Handley | C23F 13/04 411/80 |
| 2008/0204274 A1 * | 8/2008 | Peters | G08C 19/02 340/870.07 |
| 2014/0318984 A1 * | 10/2014 | Mulcahy | C23F 13/04 204/196.01 |
| 2016/0204821 A1 | 7/2016 | Han et al. | |

FOREIGN PATENT DOCUMENTS

| | | | |
|---|---|---|---|
| CN | 106835150 | B | 5/2019 |
| JP | 2003323688 | A | 11/2003 |
| RU | 2392536 | C1 | 6/2010 |
| RU | 106447 | U1 | 10/2011 |
| RU | 2580610 | C2 | 10/2016 |
| RU | 2690261 | C1 | 5/2019 |

OTHER PUBLICATIONS

RF ("What is a Helical Antenna", 2017, pp. 1-2) (Year: 2017).*

* cited by examiner

*Primary Examiner* — Alexander W Keeling

(74) *Attorney, Agent, or Firm* — Cohen IP Law Group, PC; Michael N. Cohen

(57) ABSTRACT

An automated system for measuring the voltage potential across test coupons, reference cells and metal structures is disclosed. The system may evaluate the amount of cathodic protection that may be applied to the metal structure. The system may automatically take, store and transmit data to a backend system via wireless and/or satellite communication systems.

15 Claims, 10 Drawing Sheets

AUTOMATED CATHODIC PROTECTION MEASUREMENT AND COMMUNICATION SYSTEM AND METHOD

RELATIONSHIPS TO PRIOR APPLICATIONS

This application claims priority to U.S. Provisional Application No. 62/907,511, filed Sep. 27, 2019, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to cathodic protection of metal structures, including a fully automated test system for measuring the amount of cathodic protection provided such structures and for wirelessly transmitting the results.

BACKGROUND OF THE INVENTION

Cathodic protection (CP) of large metal structures such as pipelines, storage tanks, drilling rigs and other types of metal structures is a technique used to control and reduce the corrosion of the metal surfaces of the structures. During the process, the metal surface to be protected may be forced to be the cathode of an electrochemical cell. In this way, there may be a flow of current into the metal to be protected (the cathode) from an anode which may counteract corrosion.

In order to ensure that a particular metal structure (e.g., a pipeline) is adequately protected by CP, measurements may be made, and the results may be compared to established criteria.

One methodology may include the positioning of test coupons in close vicinity of the structure, wherein the coupons may comprise the same material as the structure being protected. The procedure may then involve making voltage potential measurements between the coupons and a reference electrode. It may be preferable that the coupons comprise the same material as the structure but with no coating. In this way, the coupons may represent a section of the structure where the coating may be damaged, may include a defect or may not have been applied (coating holiday). The test coupons may be electrically connected to the metal structure being protected so that the coupons and the structure may be at the same potential, and therefore may receive the same amount of CP. The voltage measurement between the test coupons and the reference electrode may then represent the cathodic protection present on the metal structure being protected.

Wires may extend from the test coupons and the structure to the surface where the wires may be accessible for electrical measurements. In this way, the voltage measurements may be taken, and the cathodic protection may be assessed.

However, this may require a knowledgeable person to physically travel to each CP test site to make the measurements, and with tens of thousands of such sites, this may be extremely time consuming and costly.

Accordingly, there is a need for an automated test system that may make such measurements automatically.

In addition, there is a need for the automated test system to transmit the measurement results to a centralized location to be analyzed and disseminated, thus avoiding manual data collection.

Cellular networks may be utilized to transmit and/or relay the measurement data to the centralized location. However, in many geographical areas cellular networks (being terrestrial) may be obstructed and may provide only limited connectivity to such an automated CP test system.

Accordingly, there is a need for an automated CP test assembly and system that may automatically take measurement data and then transmit the measurement data via satellite communications systems to a centralize location to avoid connectivity limitations.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE EXEMPLARY EMBODIMENTS

The term "mechanism," as used herein, refers to any device(s), process(es), service(s), or combination thereof. A mechanism may be implemented in hardware, software, firmware, using a special-purpose device, or any combination thereof. A mechanism may be mechanical or electrical or a combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

In general, the system 10 and method according to exemplary embodiments hereof provides equipment, devices, components, methods and procedures for monitoring, measuring, evaluating, confirming, gauging, assessing, quantifying, calculating, computing, determining and observing the amount, level and criteria for cathodic protection of a structure 12 and/or combination of structures 12. The system 10 and method according to exemplary embodiments hereof also provides for the above activities to be fully automated, and for the results of the above activities to be transmitted wirelessly to a centralized server (e.g., a cloud server) where they can be analyzed and/or accessed.

Figure 1:
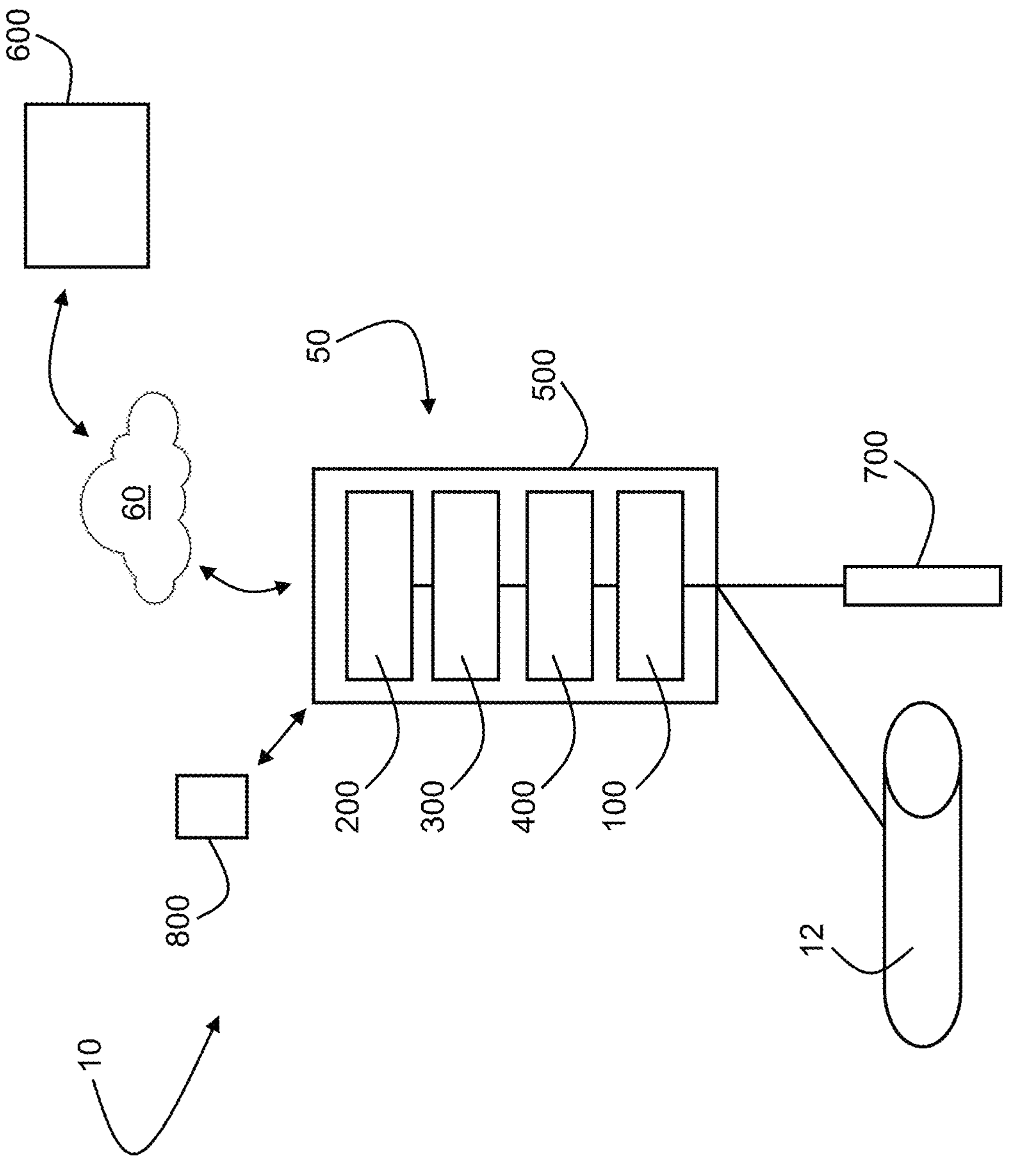
FIG. 1 shows aspects of an automated measurement and communication system according to exemplary embodiments hereof.

In some exemplary embodiments hereof as shown in FIG. 1, the system 10 may include an automated CP test assembly 50 comprising a test and measurement assembly 100, a communication assembly 200, a power assembly 300, a controller assembly 400, and a housing assembly 500. Note that FIG. 1 is a block diagram meant for demonstrational purposes and does not represent the actual sizes, shapes, proportions, orientations, or locations of the various assemblies within the housing 500, structures, etc. The system 10 also may include a backend platform 600 (e.g., a cloud platform). In some embodiments the system 10 also may include a test probe assembly 700. The system 10 also may utilize separate measurement and test equipment 800, and other devices, components and elements as required by the system 10. The system 10 may be configured to characterize the CP protection of the structure 12 (e.g., an underground pipeline). The automated test assembly 50 may communicate with the backend 600 via a communications system (e.g., a satellite communication system 60).

Cathodic Protection—Overview

Cathodic protection (CP) is a technique used to control and reduce the corrosion of metal surfaces. As is known in the art, corrosion may occur as a metal loses electrons to its surroundings. The corrosion process occurs with the removal of electrons (oxidation) of the metal and the consumption of those electrons by some other reduction reaction, such as oxygen reduction. To counteract the loss of electrons, the metal surface to be protected may be forced to be the cathode of an electrochemical cell. In this way, there may be a flow of current into the metal to be protected (the cathode) from an anode. It may be preferable that the level of current flowing into the metal structure overcome the naturally occurring loss of electrons from the metal structure so that corrosion may be controlled at a reduced level. CP may be used to protect large metal structures such as pipelines, storage tanks, drilling rigs and other types of metal structures.

One method of CP may involve connecting the metal to be protected to a more easily corroded metal to act as the anode (e.g., a galvanic anode). The more easily corroded metal (the galvanic anode) may then corrode instead of the protected metal. For this reason, the anode metal may often be referred to as a sacrificial anode.

A second method of CP may involve impressing a direct current between an inert anode and the metal structure to be protected. This method may be preferred for larger structures, or where electrolyte resistivity is high, and where galvanic anodes may not deliver enough current to provide protection. The direct current may be applied to the system by a transformer rectifier or by other sources of direct current. The anode may be buried in proximity to the metal structure and a low voltage DC may be impressed between the anode and the cathode (the metal structure to be protected) such that the desired amount of current may flow into the metal structure.

Criteria and Measurement of Cathodic Protection

In order to ensure that a particular metal structure (e.g., a pipeline) is adequately protected by CP, measurements may be made, and the results may be compared to established criteria.

There are several measurement methodologies that may be employed to ensure adequate CP. A first method may include measuring the potential between the structure to be protected and a reference electrode (e.g., a copper sulfate reference electrode or CSE), and comparing the results to established criteria. However, an IR (voltage) drop may exist in the soil or across the structure's coating that may produce an error in the pipe-to-soil (p/s) potential measurement. This error varies from pipeline to pipeline and even along the length of a given pipe. This IR-drop is affected by soil resistivity, depth of burial, coating condition, and the amount of CP current. One method to correct for this IR-drop may be to interrupt the CP current and measure an off-potential immediately following interruption. The off-potential measured by interruption is an estimate of the polarized potential of the pipe. However, there are a number of problems with the off-potential method and the method may be difficult to implement.

A second methodology that may overcome the problems of the prior described method may include positioning test coupons in close vicinity of the structure, where the coupons may comprise the same material as the structure being protected. The procedure may then involve making voltage potential measurements between the coupons and a reference electrode. It may be preferable that the coupons comprise the same material as the structure but with no coating. In this way, the coupons may represent a section of the structure where the coating may be damaged, may include a defect or may not have been applied (coating holiday). The test coupons may be electrically connected to the metal structure being protected so that the coupons and the structure may be at the same potential, and therefore may receive the same amount of CP. The voltage measurement between the test coupons and the reference electrode may then represent the cathodic protection present on the metal structure being protected. The polarized potential of the coupon may not mirror the pipe polarized potential and may thereby reduce the problems described above.

The Automated Test Assembly

In one exemplary embodiment hereof as shown in FIGS. 1-4B, the system 10 may include an automated test assembly 50 that may include a measurement assembly 100, a communication assembly 200, a power assembly 300 and a controller assembly 400, all housed within a housing assembly 500. The housing assembly 500 may include a body 502 with an inner volume 504, a top 506 and a bottom 508.

In one exemplary embodiment hereof, the body 502 of the housing assembly 500 may be placed below grade with its removable top 506 generally at grade level (generally flush with the surface 14 of the ground) and accessible (e.g., to be opened as required). The test and measurement assembly 100, the communication assembly 200, the power assembly 300 and the controller assembly 400 may be located within the inner volume 504 of the housing 500. The power assembly 300 may provide power to the measurement assembly 100, the communications assembly 200, the controller assembly 400 and to other elements and components that may require power. The housing assembly 500 may preferably be adapted to fit within a submerged barrel test structure 16 (also referred to as a test box, a curbside box, a buffalo box, a test point box, a valve box, etc.), however, the housing assembly 500 also may be placed in other configurations as required by the system 10.

In one exemplary embodiment hereof, the test and measurement assembly 100 may be electrically configured with a test probe assembly 700 that may be buried beneath the ground (below grade) and that may be configured to measure the cathodic protection of a structure 12 (e.g., an underground pipeline, tank, etc.). The test probe assembly 700 may be configured in close proximity to the structure 12 as is known in the art.

Figure 2:
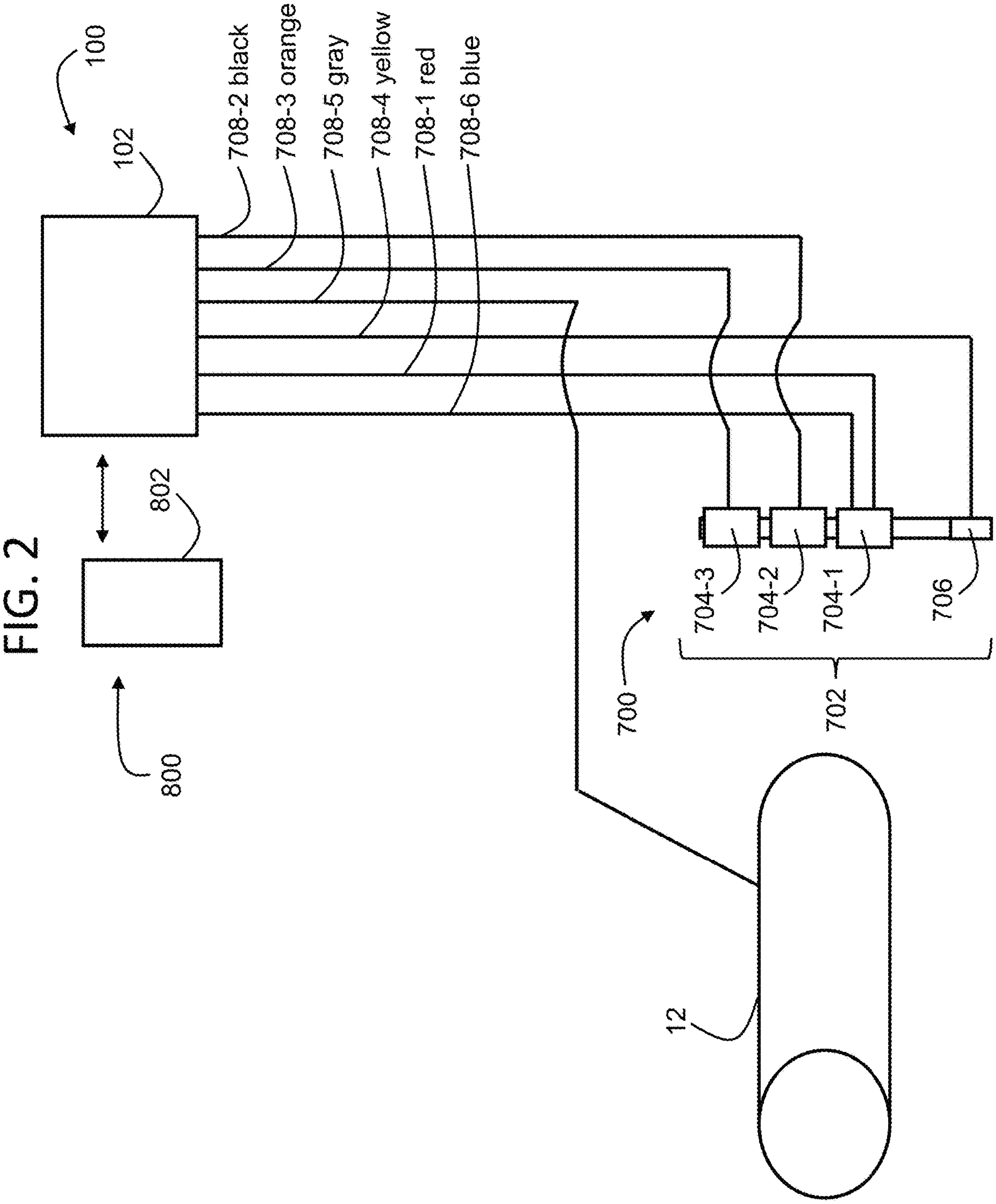
FIGS. 2-3 show aspects of an automated measurement assembly according to exemplary embodiments hereof.
Figure 3:
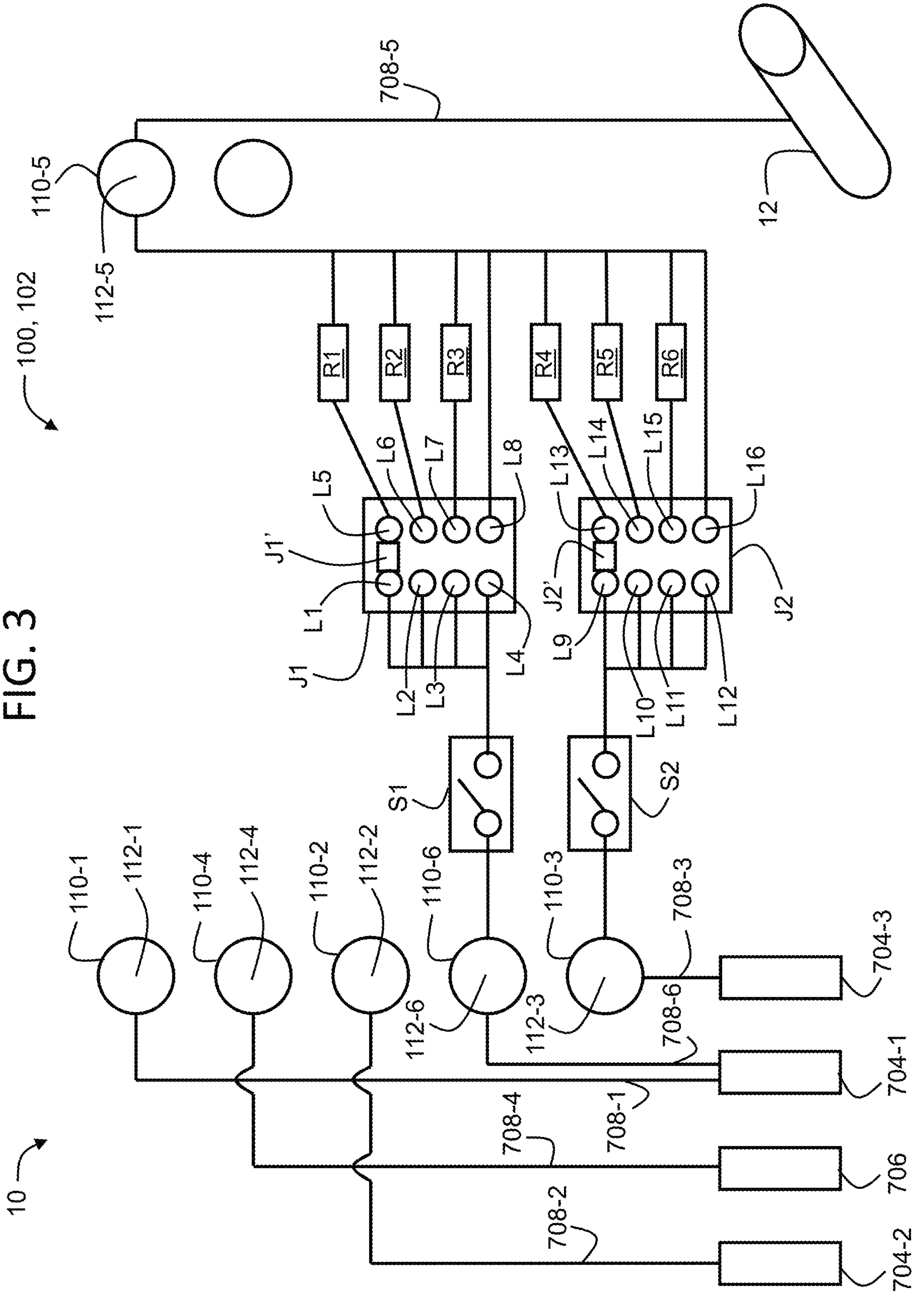

In one exemplary embodiment hereof as shown in FIGS. 2-3, the test probe assembly 700 may correlate with a test probe assembly disclosed in U.S. patent application Ser. No. 16/522,606, filed Jul. 25, 2019, the entire contents of which are hereby fully incorporated herein by reference for all purposes. For example, the test probe assembly 700 may include one or more test probes 702 that may correlate to one or more test probes disclosed in Ser. No. 16/522,606, each test probe 702 including one or more test coupons 704 (e.g., 704-1, 704-2, 704-3, . . . 704-*n*) that may correlate to one or more test coupons associated with each test probe disclosed in Ser. No. 16/522,606, and a reference electrode 706 that may correlate to a reference electrode disclosed in Ser. No. 16/522,606. The test probe assembly 700 also may include wires 708 (e.g., 708-1, 708-2, 708-3, 708-4, 708-5, 708-6, . . . 708-*n*) (preferably color coded) leading from each of the one or more test coupons 704, the reference electrode 706 and the structure 12 to the measurement connection assembly 100 that may correlate to wires disclosed in Ser. No. 16/522,606.

In one exemplary embodiment hereof, the test and measurement assembly 100 may include a connection assembly 102, a switching assembly 104, a voltage and/or current measuring device 106 (e.g., a digital multimeter (DMM)) and other elements and components required by the measurement assembly 100 to perform its functionalities.

In one exemplary embodiment hereof, the connection assembly 102 may electrically receive the wires 708 from each respective test coupon 704 and the reference electrode 706. The connection assembly 102 also may electrically receive a wire 708 that may be electrically configured with the structure 12.

In one exemplary embodiment hereof, the connection assembly 102 may correlate with a connection assembly disclosed in U.S. patent application Ser. No. 16/522,606, filed Jul. 25, 2019, the entire contents of which are hereby fully incorporated herein by reference for all purposes. For example, the connection assembly 102 may include one or more switches Sn (e.g., S1 and S2), one or more junctions Jn (e.g., junction J1 and J2) with input leads $L_i$ (e.g., L1, L2, L3, L4, and L9, L10, L11, L12) and output leads $L_o$ (e.g., L5, L6, L7, L8 and L13, L14, L15, L16) one or more junction jumpers Jn' (e.g., J1' and J2') and one or more resistors Rn (e.g., R1, R2, R3 and R4, R5, R6) that may correlate with switches, junctions with input leads and with output leads, junction jumpers, and resistors respectively as disclosed in Ser. No. 16/522,606. The connection assembly 102 also may include terminals 110-1, 110-2, 110-3, 110-4, 110-5, 110-6 each electrically configured with associated output jacks 112-1, 112-2, 112-3, 112-4, 112-5, 112-6 (also referred to as manual test leads 112-*n*), respectively, that may correlate with terminals with associated output jacks as disclosed in Ser. No. 16/522,606.

For example, as shown in FIG. 3, test coupon 704-1 may be electrically connected to wire 708-1 that may be electrically connected to terminal 110-1 and output jack 112-1. Test coupon 704-1 also may be electrically connected to wire 708-6 that may be electrically connected to terminal 110-6, output jack 112-6 and switch S1. Test coupon 704-2 may be electrically connected to wire 708-2 that may be electrically connected to terminal 110-2 and output jack 112-2. Test coupon 704-3 may be electrically connected to wire 708-3 that may be electrically connected to terminal 110-3 and output jack 112-3 and to switch S2. Reference electrode 706 may be electrically connected to wire 708-4 that may be electrically connected to terminal 110-4 and output jack 112-4. The structure 12 may be electrically connected to wire 708-5 and output jack 112-5.

The switching assembly 104 may include a series of input terminals $T_{in}$-n, a series of output terminals $T_{out}$-n, and controllable relays, switches and/or other signal directing devices configured between the input terminals $T_{in}$-n and the output terminals $T_{out}$-n. In this way, the switching assembly 104 may be controlled (e.g., by the controller 400) to direct signals from any particular input terminal(s) $T_{in}$-n to any particular output terminal(s) $T_{out}$-n.

Figure 4A:
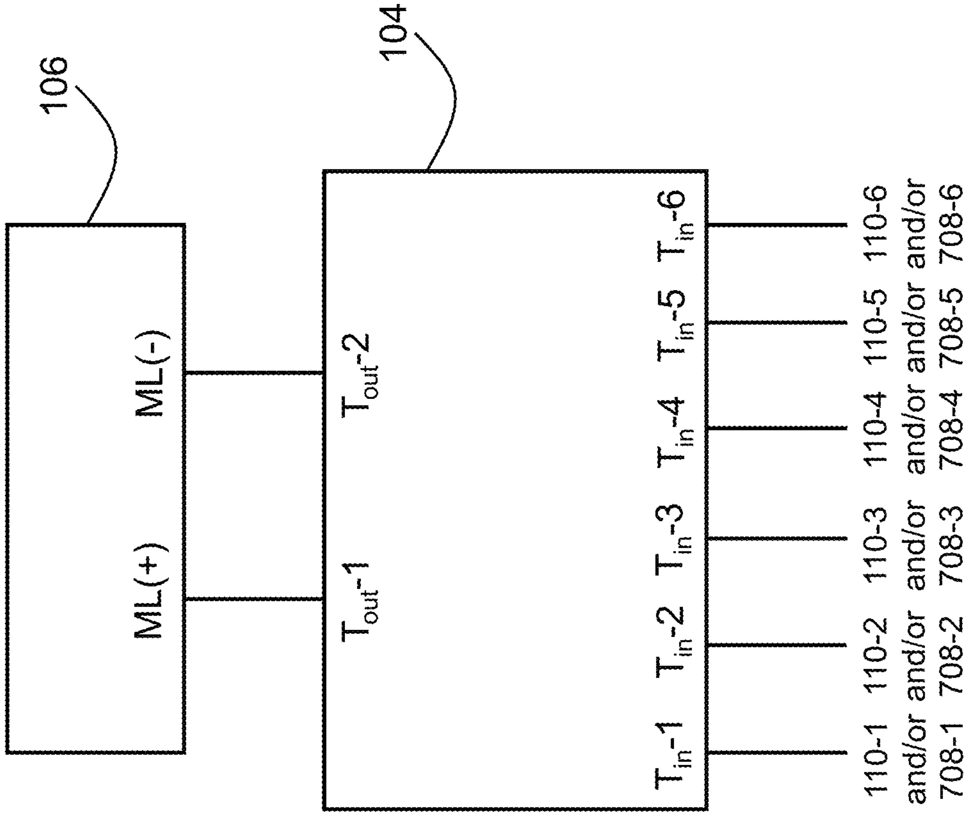
FIG. 4A shows aspects of a connection assembly according to exemplary embodiments hereof.
Figure 4B:
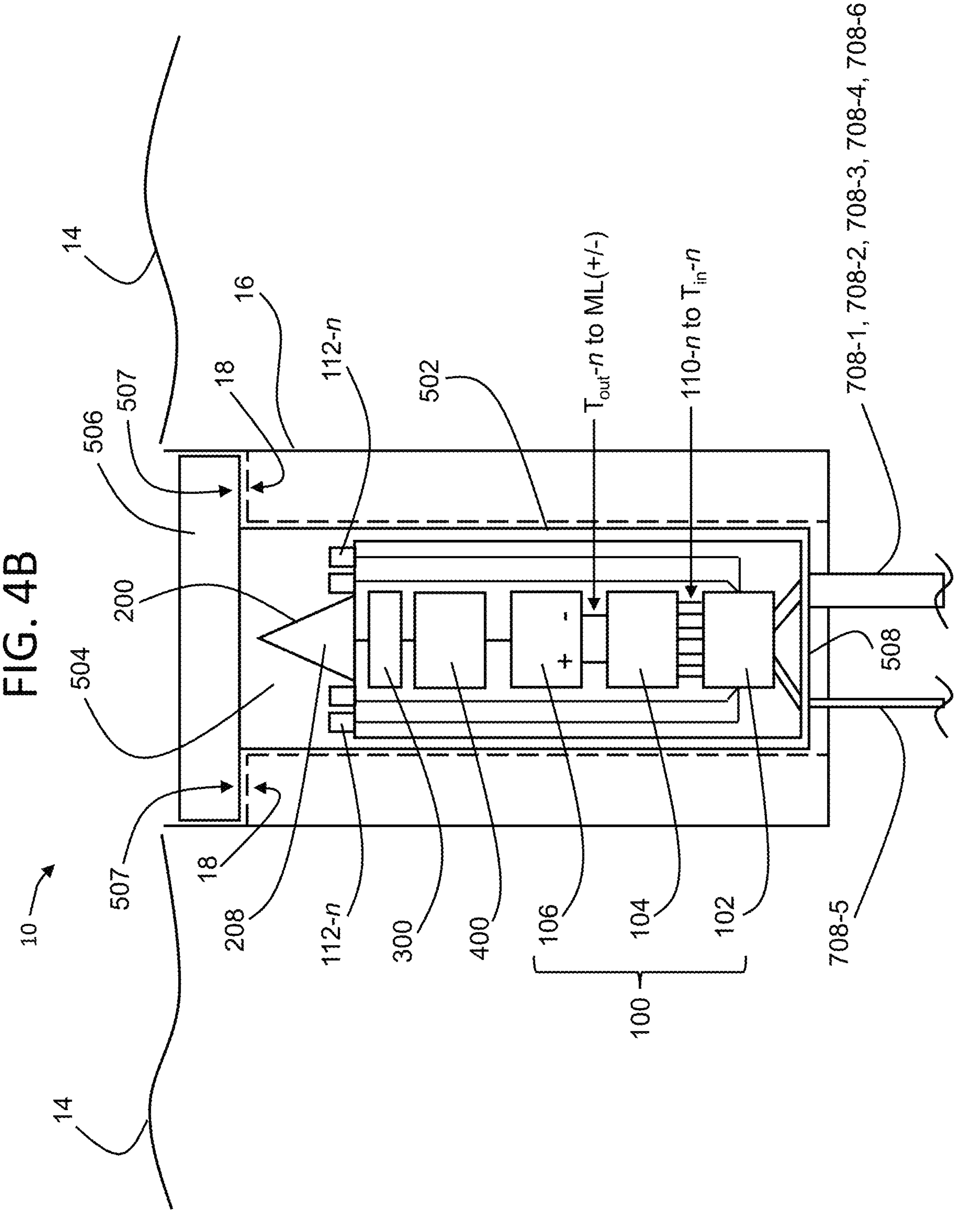
FIG. 4B shows aspects of an automated measurement and communication system according to exemplary embodiments hereof.

In one exemplary embodiment hereof as shown in FIGS. 4A and 4B, the input terminals $T_{in}$-1 through $T_{in}$-6 may be configured with the terminals 110-1 through 110-6 (and/or to wires 708-1 through 708-6), respectively, and the output terminals $T_{out}$-1 and $T_{out}$-2 may be electrically configured with the positive measurement lead ML(+) and the negative measurement lead ML(−), respectively, of the voltage and/or current measuring device 106. In this way, the switching assembly 104 may be controlled (e.g., by the controller 400) to systematically switch or otherwise direct the signals from any particular terminals 110-*n* (and/or wires 708-*n*) to any particular measurement leads ML(+/−) of the voltage and/or current measuring device 106. Once the desired terminals 110-*n* (and/or wires 708-*n*) are electrically connected to the desired measurement leads ML(+/−), the controller 400 may trigger the measuring device 106 to take voltage and/or current readings across the leads ML(+/−).

The controller assembly 400 may include a microprocessor, a microcontroller, a computer, and/or any other type of processor, memory and associated electronics and software as required. In one exemplary embodiment hereof the controller 400 may control the switching assembly 104 to electrically connect the appropriate terminal(s) 110-*n* (and/or wires 708-*n*) to the appropriate measurement leads ML(+/−). Once these are properly configured, the controller 400 may control the measuring device 106 to take measurements across the measurement leads ML(+/−) at the appropriate time and under the appropriate conditions, and to store the measurement data in local memory (RAM, hard drive, etc.). The measurement data may be stored within a database or other filing system to be aggregated and transmitted via the communication assembly 200 according to a predetermined schedule and/or when otherwise triggered to do so. The controller 400 also may control the switches Sn within the connection assembly 102 to switch the resistor(s) Rn into and out of the transmission line path(s) as shown in FIG. 3 as required by the system 10.

Accordingly, the system 10 provides a fully automated cathodic protection measurement and characterization system. Further details will be described in other sections.

Deployment Below Grade

In some exemplary embodiments hereof as shown in FIG. 4B, the housing assembly 500 may be adapted to fit within a partially or fully submerged barrel test structure 16 (also referred to as a test box, a curbside box, a buffalo box, a test point box, a valve box, etc.). The test boxes 16 may be preexisting or installed specifically for the use of the system 10. The test box(es) 16 may preferably be in close proximity to the test probe assembly 700 and the cathodic protected structures 12 that may need to be tested. The test probe assembly 700 may be buried in close proximity to the structure 12 as is known in the art, and the wires 708-*n* leading from the test probe assembly 700 and/or the structure 12 may extend to the text box(es) 16 and to the automated test assembly 50 within the box 16.

As is known in the art, the text boxes 16 are generally standardized in shape, size and form factor, and accordingly, the housing 500 may be adapted to conform to the size, shape and form factor(s) of the test box 16 that may receive the housing 500. The horizontal cross-section of the test box 16 may typically be circular (the test box 16 may resemble a vertical barrel), and so the housing body 502 also may be generally cylindrical (also may be generally barrel-shaped) with a diameter that may fit within the diameter of the test box 16.

Being partially or fully submerged below grade poses environmental criteria that the housing 500 must meet. For example, the housing 500 may be fully watertight and may not allow any water to penetrate its inner volume 504. Accordingly, when the removable top 506 may be attached to the body 502, it may be attached in such a way that it may be sealed in a watertight and airtight configuration (e.g., with gaskets, O-rings, etc.). In this way the assemblies 100, 200, 300 and 400, and the other elements and components within the housing 500 may be protected from water contamination.

In one exemplary embodiment hereof, the top 506 of the housing 500 may be screwed onto the top of the housing body 502 (with mating threads) and the seal between the top 506 and the body 502 may result in a watertight and airtight configuration. In other embodiments, the top 506 may be attached to the top of the housing body 502 using clamps, detents, screws, bolts/nuts, pressure fit, other attachment mechanisms and any combination thereof. Gaskets may be used between the top 506 and the body 502 as necessary. Regardless of how the top 506 may be attached to the body 502 of the housing, the seal between the top 506 and the body 502 may preferably be airtight and watertight.

Figure 6:
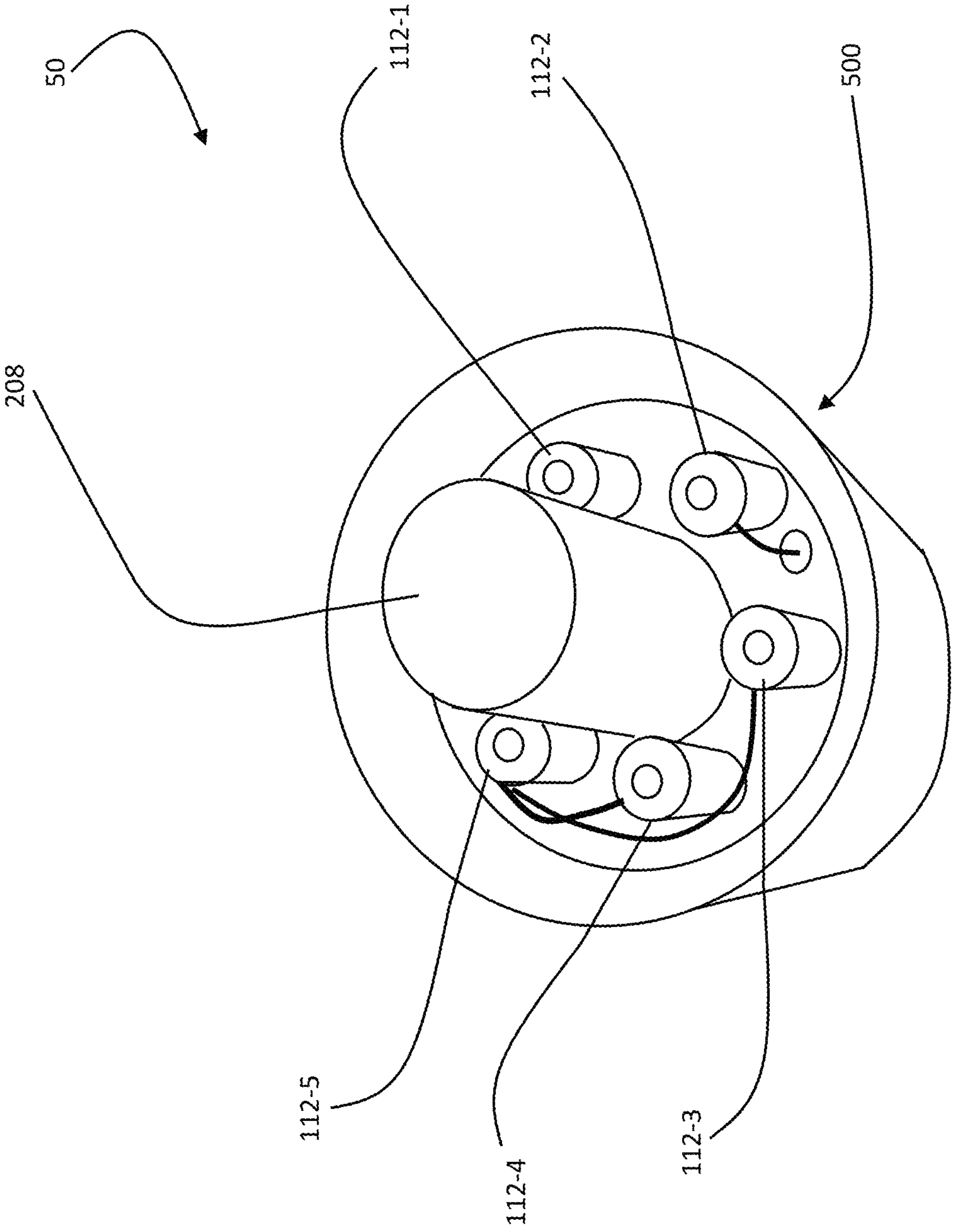
FIGS. 6-8 show aspects of an automated measurement and communication assembly according to exemplary embodiments hereof.

In addition, when the top 506 may be removed (thereby creating an open top), the upper portion of the inner volume 504 may preferably be accessible (e.g., from above through the open top). In some embodiments, the antenna 208 and/or the manual test leads 112-*n* are positioned in the upper portion of the inner volume 504. In this way, the antenna 208 and/or the leads 112-*n* that may be positioned in the upper portion of the inner volume 504 may be directly accessible from the open top of the body 502 as required. In some embodiments, the manual test leads 112-*n* are electrically connected to the wires 708-*n* through the connection assembly 102 and/or through wires or other types of electrical connections (e.g., by wires extending from the connection assembly 102 to the manual test leads 112-*n* positioned in the upper portion of the inner volume 504 as shown in FIGS. 4B and 6).

For the purposes of this specification, the term "directly accessible" means that the manual test leads 112-*n* and/or antenna 208 are accessible without obstruction from any other component of the system 10. That is, with the top 506 removed, a technician may access the manual test leads 112-*n* (e.g., using test probes 802 configured with separate portable measurement equipment 800) and/or the antenna 208 without having to remove, move, alter or reconfigure any other component of the system 10. In this case, the technician may simply extend the test probes 802 into the upper portion of the inner volume 504 from above to make electrical contact with the manual test leads 112-*n*. This is shown in FIGS. 4B and 6.

In some embodiments as shown in FIG. 4B, the top of the test box 16 may include a top ledge 18, and the top 506 of the housing 500 may include an outwardly extending rim 507 adapted to extend outward an amount such that at least a portion of the underside of the rim 507 may abut with or generally rest on the test box ledge 18. In some embodiments, the rim 507 may extend entirely or at least partially around the outer circumference of the housing's top 506. In other embodiments, one more rims 507 may be coupled with the housing's top 506 to engage with the ledge 18. In any event, at least a portion of the rim(s) 507 may generally rest on the ledge 18. In this way, the housing 500 may be held in place vertically by the abutment of the rim 507 and the test box ledge 18.

Because the top 506 may be exposed to the elements (e.g., if the top of the test box 16 is open or otherwise exposed), it may be preferable that the top 506 be sufficiently rugged to withstand external forces that may be applied to the top 506. For example, the test box 16 may be installed into the pavement of a street in which case the top 506 must withstand cars driving over it. In other cases, the test box 16 may be installed in areas with intense weather conditions, in which case the top 506 must withstand these forces. In any event, it may be preferable that the top 506 (and by extension, the entire housing 500) may be able to withstand any forces that may be applied to it while deployed.

As discussed, in some embodiments, the manual test leads 112-*n* (also referred to as output jacks 112-*n*) may be located in the upper portion of the inner volume 504 of the housing 500 so that when the top 506 is removed, the leads 112-*n* are exposed and directly accessible. The manual test leads 112-*n* may provide banana jacks (e.g., output jacks 112) (preferably color coded for easy identification) or other types of terminals that may allow for the quick and easy connection between the separate measurement and test equipment (M&TE) 800 (e.g., a portable DMM) and the leads 112-*n*. See FIG. 6. This may be required when a user may physically visit the automated test assembly 50 to take manual readings. In this case, the user may remove the top 506 of the housing 500 to expose and access the test leads 112-*n*, connect the separate M&TE 800 and take the required readings.

In another exemplary embodiment hereof, the system 10 may provide an application, such as a mobile application (app) that may be downloaded and run on a device such as a smart phone, tablet computer, laptop, or other type of device. In one use case of the mobile app, when the user may be physically located at the test assembly 50 to make manual measurements, he/she may use the mobile app to instruct the controller assembly 400 to apply the necessary measurement conditions within the unit 50 for the particular desired measurements to be made. The mobile app may be an extension of the backend system 600 and/or the data management system 602 (described in other sections) and may include a graphical user interface (GUI) with tools that may provide for the set-up, usage and general control of the automated test assembly 50. In one example, the user may use the mobile app to set the switch assembly 104 to electrically connect the required wires 110-*n* to the manual test leads 112-*n* to make the requirement measurement readings. Other configurations, setting, parameters and other elements may be also set, managed, and otherwise controlled using the mobile app.

The bottom 508 of the housing 500 may receive the wires 708-*n* (e.g., 708-1 through 708-6) into the housing 500. In one exemplary embodiment hereof, the wires 708-1, 708-2, 708-3, 708-4 and 708-6 may be bundled together in one or more waterproof jackets. The wire 708-5 may be separate from the other wires because it may lead to the structure 12 instead of the test coupon assembly 702 and the test coupons 704-*n*. However, this may not be necessary. The wire 708-5 also may be wrapped in a waterproof jacket.

Figure 7:
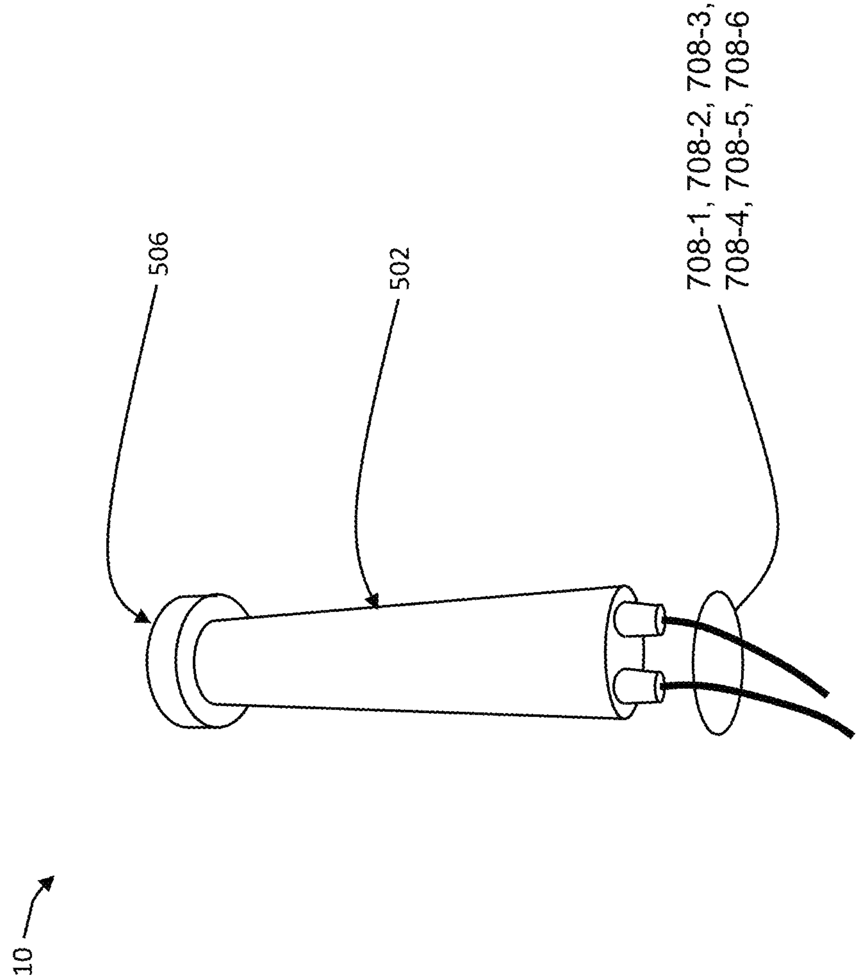

The bottom 508 of the housing 500 may receive the wires 708-*n* through openings in the bottom 508, and the openings may be sealed around the wires 708-*n* and/or the bundles of wires 708-*n* to be watertight and airtight. In this way, no water may penetrate the inner volume 504 of the housing in this area. This is shown in FIG. 7.

In another exemplary embodiment hereof, the bottom 508 may be generally open and may instead use "diving bell" physics to prevent water contamination and/or water condensation from reaching the upper portions of the inner volume 504 where the assemblies 100, 200, 300 and 400 may require a condensation-free environment. In some exemplary embodiments hereof, oil may be applied to the lower area of the inner volume 504 to prevent water condensation from entering into the areas of the inner volume 504 where it is not wanted.

With the described configuration of the probes 702, coupons 704, reference electrode(s) 706, structure 12, wires 708, switching assembly 104 (including input terminals $T_{in}$-n configured with the terminals 204-*n* and output terminals $T_{out}$-n configured with the positive measurement lead ML(+) and/or the negative measurement lead ML(−) of the voltage and/or current measuring device 106), voltage and/or current measuring device 106 and the controller 400, measurements relating to the test coupons 704, the reference electrode 706 and the structure 12 may be taken to quantify the structure's level of cathodic protection.

In some exemplary embodiments hereof, the automated test assembly 50 may be configured to measure CP measurement parameters relating to one structure 12. In other exemplary embodiments hereof, the automated test assembly 50 may be configured to measure CP measurement parameters relating to two or more structures 12. Characterizing two or more structures 12 may require including the necessary test coupons and reference electrodes for the additional structures 12 and configuring the measurement assembly 100 and other assemblies accordingly.

In some exemplary embodiments hereof, the automated test assembly 50 may be configured to take a wide variety of CP test measurements, including but not limited to the following:

1. DC Structure 1 Potential
2. DC Structure 2 Potential
3. AC Structure 1 Potential
4. AC Structure 2 Potential
5. DC Coupon ON Potential
6. DC Coupon instant OFF Potential
7. AC Coupon Potential
8. Native Coupon Potential
9. DC Current and Current Density
10. AC Current and Current Density It is understood by a person of ordinary skill in the art, upon reading this specification, that the measurement examples described above are meant for demonstrational purposes, and that other configurations between the measurement assembly 100 and the test probes assembly 100 and the structure(s) 12 may also be utilized to make other types of measurements. It also is understood that the configurations of the measurement assembly 100 and the test probes 700 and the structure(s) 12 do not limit the scope of the system 10 in any way. It also is understood that the types of measurements made and the types measurement assemblies 100 and/or test probes 700 used do not limit the scope of the system 10 in any way.

In one exemplary embodiment hereof, the measurement data taken as described above or otherwise may be stored to local memory within the measurement assembly 100 and/or the controller 400 (and/or elsewhere as required). As will be described in other sections, the measurement data may then be transmitted wirelessly to a centralized location (e.g., a cloud server).

Communication

In one exemplary embodiment hereof, the system 10 may include a communication assembly 200 that may include a modem 202, an antenna 204 and other elements and components (e.g., amplifiers, filters, up-converters, down-converters, mixers, electronics, etc.) as necessary for the communications assembly 200 to perform its functionalities.

Data from the system 10 may be provided to the modem 202 where it may be converted (modulated) from digital format to analog format and provided to the antenna 204 for transmission as radio waves. Data that may be received by the antenna 204 may be directed the modem 202, converted (demodulated) from analog to digital format and provided to the controller 400, stored in memory, analyzed, etc.

In one exemplary embodiment hereof, the communication assembly 200 may transmit data coming directly from the measurement assembly 106, measurement data stored in memory, system data (e.g., system status data stored in memory or in real time), other data and any combination thereof. The transmitted measurement data may include the data taken by the measurement assembly 100 that may quantify the cathodic protection of the structure 12. The transmitted system data may include data that represents the health status of the system (e.g., battery charge status, system problems, etc.). Other types of data also may be transmitted. In other exemplary embodiments, the communication assembly 200 may receive data and information as described in other sections.

In one exemplary embodiment hereof, the communication assembly 200 may transmit data to and receive data from the backend platform 500 using any type(s) and/or any combinations of types of communications systems and protocols as required.

Figure 5:
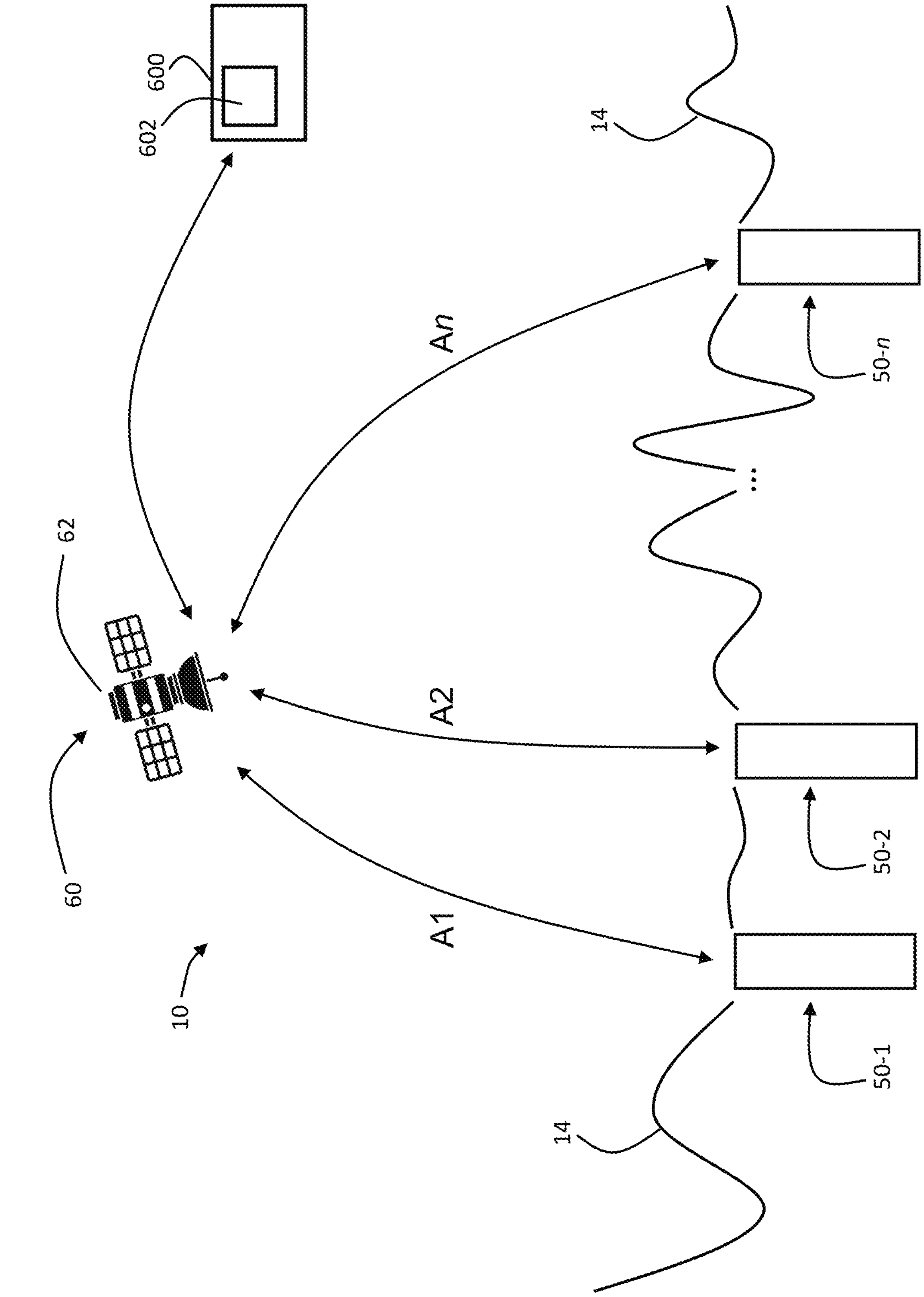
FIG. 5 shows aspects of an automated measurement and communication system according to exemplary embodiments hereof.

In one exemplary embodiment hereof, the communication assembly 200 may transmit and receive data over the Internet via mobile Internet access (also referred to as mobile broadband that may utilize cellular networks) and/or via satellite Internet access that may provide Internet access through communication satellites (see FIG. 5). The communication assembly 200 may also transmit and receive the data over other types of network architectures (e.g., WAN, wireless WAN, WWAN, and other types of networks), other types of communication systems and any combination thereof.

In one exemplary embodiment hereof, the communication assembly 200 may transmit and receive data utilizing mobile communications technologies including cellular networks (such as GSM, CDMA, TDMA, etc.) that may be terrestrial based (may utilize cell towers to receive, relay and transmit the data). Terrestrial based communication systems may work well when there may be a clear and unobstructed line of sight from the terrestrial tower(s) to the antenna 204. However, in other scenarios where line of sights between the antenna 204 and the terrestrial cell towers may be obstructed (e.g., in mountainous regions, valleys, etc.) these cellular systems may not provide adequate connectivity coverage for the system 10.

Accordingly, in one exemplary embodiment hereof, the system 10 may transmit and receive data using satellite communications systems (which may utilize TDMA as a channel access method for example). The satellite communication systems may provide direct access to orbiting satellites (e.g., geostationary satellites) instead of terrestrial cell sites, thus providing clear and unobstructed lines of site between the antenna 204 and the satellite(s) and thereby providing more reliable connectivity. This overcomes the limitations of cellular networks that may or may not provide adequate connectivity and/or coverage depending on the geographical location of the system 10 and of the cell towers.

In one exemplary embodiment hereof, the antenna 204 may be designed to perform adequately with the type of communication system(s) that the communication assembly 200 may communicate with. For example, the antenna 208 may include an isotropic antenna, an omnidirectional antenna, a semi-directional antenna, a directional antenna (also referred to as a highly-directional antenna), any other types of antennas and any combination thereof. When utilizing satellite communication systems, in one exemplary embodiment hereof the antenna 208 may include a helix antenna 208 that may be directional. In this implementation, the helix antenna 208 may be oriented vertically so that it may radiate radiation upward along its vertical axis. This architecture may facilitate a direct line of sight between the antenna 208 and the satellite(s) in the satellite communication system even with the antenna 208 submerged within the housing 500 below grade (below the surface 14 of the ground).

With the top 506 of the housing removed, the antenna 208 may be positioned in the upper portion of the inner volume 504 and be directly accessible when the top 506 is removed as shown in FIG. 6. The antenna 208 may then be removed (e.g., unscrewed from the communication assembly 200) and replaced with a different type of antenna 208 as required for any specific application of the system 10 (e.g., when using a different communication system that may require a different type of antenna). Other elements and components (e.g., the modem which may be located on a PCB) may also be removed and/or replaced depending on the application by removing the top 506 of the housing 500.

Figure 8:
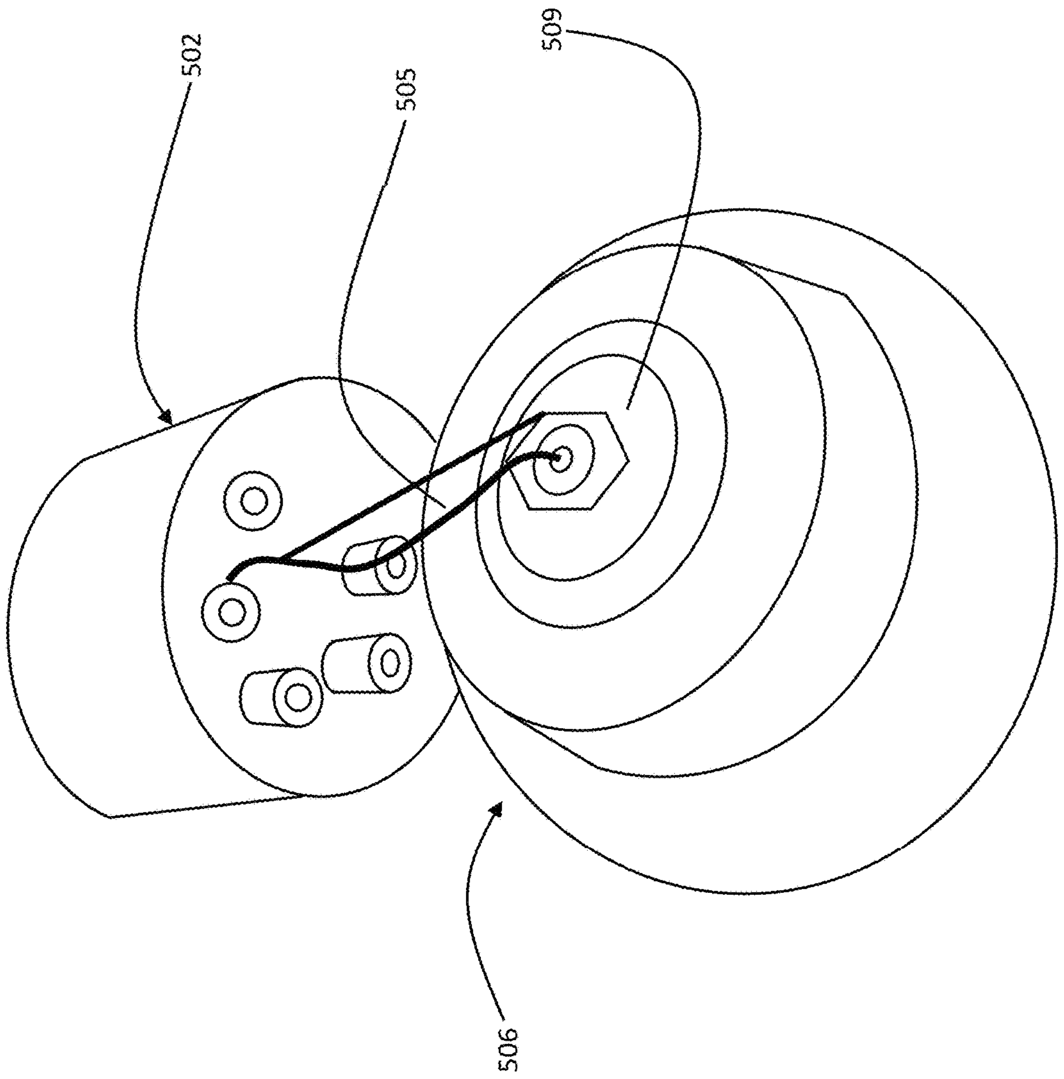

In another exemplary embodiment hereof as shown in FIG. 8, the antenna 208 may be configured within the removable top 506 of the housing 500. In this scenario, when the top 506 may be removed, the antenna 208 within the top 506 also may be removed from the housing 500. In addition, a transmission line 505 may extend from the communication assembly 200 within the housing body 502 to the antenna 208 within the top 506. Because it may be preferable that the transmission line not be rotated while the top 506 may be rotated (to screw it on and off the body 502), the top 506 may include a rotatable mount 509 that may allow the threaded portion of the top 506 to rotate while the transmission line and the antenna 208 may be held stationary. This may allow for the removal and attaching of the top 506 to the body 502 without the rotating (twisting) of the transmission line extending from the communication assembly 200 to the antenna 208. The top 506, transmission line and rotatable mount are shown in FIG. 8.

The System

As shown in FIG. 5, one or more automated test assemblies 50-1, 50-2, . . . **50-*n* (individually and collectively 50) may be submerged below grade (beneath the surface 14 of the terrain). Note that the curved lines representing the terrain may represent mountains, valleys, buildings and/or other vertical obstructions that may obstruct and limit the availability of cellular network (terrestrial) connectivity coverage. For this reason, the automated test assemblies 50 may utilize satellite communication system 60 with direct lines of site A1, A2, . . . An between the automated test assembly 50 and the satellite(s) 62. While FIG. 5 may depict a single satellite 62, it is understood that the satellite communication system 60 may include any number of satellites 62** in its constellation.

As shown in FIG. 5, the system 10 may also include a backend system 600 (e.g., a cloud server) that may also be in communication with the satellite communication system 60 (e.g., either directly or via the satellite communication system's ground station(s)). The backend platform 600 may include one or more servers that may include CPUs, memory, software, operating systems, firmware, databases, network cards and any other elements and/or components that may be required to the backend platform 600 to perform its functionalities.

The backend system 600 and the satellite communication system 60 may communicate through any type of network (e.g., the Internet) and/or systems as known in the art. In one exemplary embodiment, the backend system 600 may include one or more Internet servers. The satellite communication system 60 may provide a communications link between the automated test assemblies 50 and the backend 600.

In one exemplary embodiment hereof, the backend system 600 may identify each test assembly 50 individually so that it may communicate directly with any assembly 50 or combinations of assemblies 50 at any time. Accordingly, each automated test assembly 50 may include an identifier such as a serial number, an IP address or other type of identifier so that the control platform 600 may use to identify each test assembly 50 individually as required. In this way, the control platform 600 may receive and send data to, track the usage, the location, the energy level, and other aspects of each individual assembly 50 in real time.

In one exemplary embodiment hereof, the backend system 600 may include a data management system 602 that may receive the data from each automated test assembly **50-*n*, store the data to one or more databases, analyze the data, and disseminate the data as required. The data management system 602 may provide a web-based user portal (and/or mobile app as described in other sections) that may allow users to log into the data management system 602 to view the data, analyze and/or manipulate the data (e.g., apply functions, calculations, mathematics, transforms, etc. to the data), create reports, share the data, and/or perform any other actions regarding the data as required. The system 602** may provide each user with log-in credentials so that each user may have his/her own account that they may access at any time.

In one exemplary embodiment hereof, the backend system 600 and the data management system 602 may allow for third party asset management systems to be fully integrated with the backend 600 and the data management system 602. In this way, the users may utilize their own asset management systems while receiving, manipulating, analyzing, reporting, disseminating and/or otherwise managing the measurement data taken by the system 10.

In one exemplary embodiment hereof, the data management system 602 may also allow for the users to communicate directly with each applicable automated test assembly 50 in real time. In addition to receiving data from each automated test assembly **50-*n*, the users may program the test assemblies 50-*n* to take different types of measurements, to set the schedule of when the measurements will be taken, to troubleshoot the assemblies 50 if and when there may be a problem, to trigger the assembly 50 to take immediate test readings, to generally configure and/or manage the fleet of automated measurement assemblies 50-*n* under the control of the data management system 602 and to perform other activities regarding the management and usage of the test assemblies 50**-*n*. Note that the automated test assemblies 50-*n* also may include preprogramming upon installation or while in the field, such that programming the assemblies 50-*n* through the data management system 60 may or may not be required.

In one exemplary embodiment hereof, the automated test assemblies 50 may be programmed (either preprogrammed and/or through the use of the data management system 602) to perform specific measurements at specific times of the day, week, month, year, etc. The data may be stored into local memory. The automated test assemblies 50 also may be programmed to transmit the data to the backend system 600 at specific times of the day, week, month, year, etc. and on a specific recurring or real time triggered schedule. Note that specific types of measurements taken at different time and/or intervals need not match and that any type of measurement may be taken at any time.

For example, a test assembly 50 may be programmed to take measurement readings of specific parameters and store them to a database every day at a particular time. In one example, the assemblies may take readings at noon, store the data to memory, and transmit the data to the backend system 600 at midnight when bandwidth usage of the satellite communication system 60 may be minimal. In another example, the data may be transmitted at peak sunlight (e.g., during the warmest part of the day) to preserve battery life. In another example, the assemblies may take measurement data and store it to memory several times a day, and then be scheduled to transmit the aggregated data to the backend system 600 on a weekly basis, a bi-weekly basis, a monthly basis and/or at any schedule as required.

In one exemplary embodiment hereof, the power assembly 300 may include one or more batteries. In another exemplary embodiment hereof, the power assembly 300 may include one or more batteries configured with one or more capacitors. In this embodiment, the one or more batteries may charge the one or more capacitors, and the one or more capacitors may be discharged at an appropriate time to power the other assemblies (100, 200, 400, etc.) and components of the automated test assembly 50. The batteries may be Lithium ion batteries, or other types of batteries. Other types of power storage devices may also be used.

Computing

The functionalities, applications, services, mechanisms, operations, and acts shown and described above are implemented, at least in part, by software running on one or more computers (e.g., the controller assembly 400 and the backend systems 600).

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed computers, special purpose computers and computing devices. One or more such computers or computing devices may be referred to as a computer system.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Figure 9:
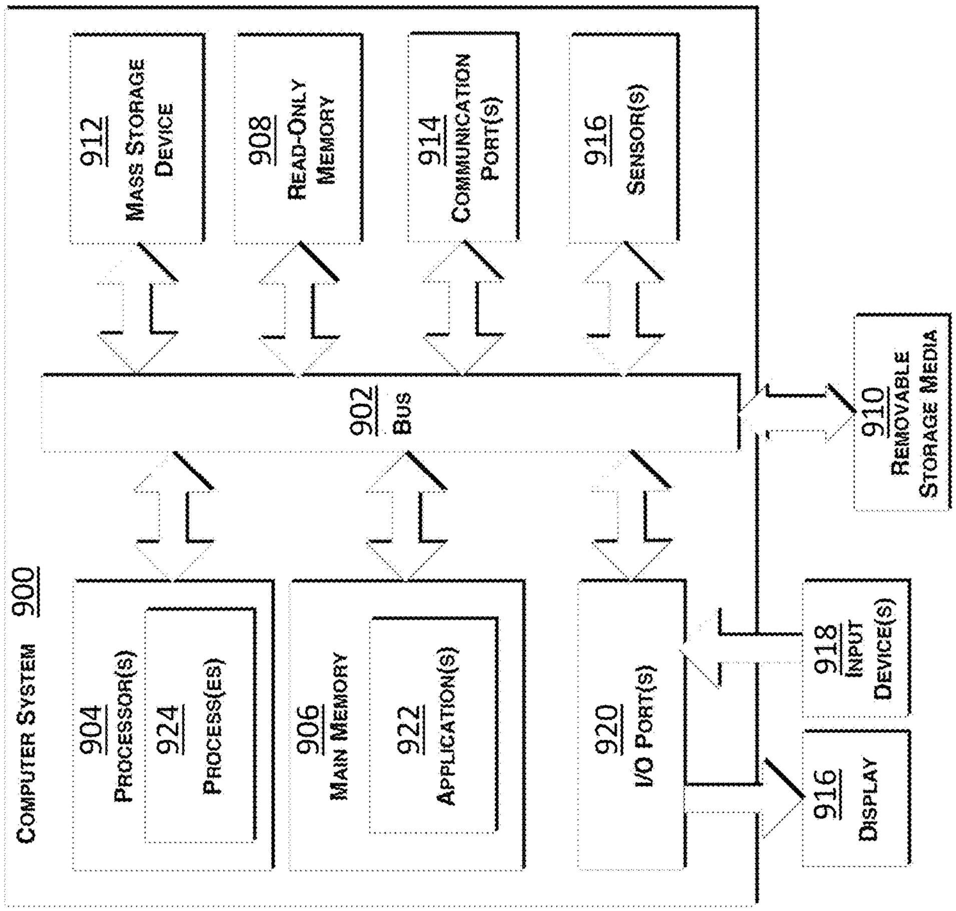
FIG. 9 shows aspects of a computing system according to exemplary embodiments hereof.

FIG. 9 is a schematic diagram of a computer system 900 upon which embodiments of the present disclosure may be implemented and carried out.

According to the present example, the computer system 900 includes a bus 902 (i.e., interconnect), one or more processors 904, a main memory 906, read-only memory 908, removable storage media 910, mass storage 912, and one or more communications ports 914. Communication port(s) 914 may be connected to one or more networks (not shown) by way of which the computer system 900 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 904 can be any known processor, such as, but not limited to, an Intel® Itanium® or Itanium 2® processor(s), AMD® Opteron® or Athlon MP® processor(s), or Motorola® lines of processors, and the like. Communications port(s) 914 can be any of an Ethernet port, a Gigabit port using copper or fiber, or a USB port, and the like. Communications port(s) 914 may be chosen depending on a network such as a Local Area Network (LAN), a Wide Area Network (WAN), or any network to which the computer system 900 connects. The computer system 900 may be in communication with peripheral devices (e.g., display screen 916, input device(s) 918) via Input/Output (I/O) port 920.

Main memory 906 can be Random Access Memory (RAM), or any other dynamic storage device(s) commonly known in the art. Read-only memory (ROM) 908 can be any static storage device(s) such as Programmable Read-Only Memory (PROM) chips for storing static information such as instructions for processor(s) 904. Mass storage 912 can be used to store information and instructions. For example, hard disk drives, an optical disc, an array of disks such as Redundant Array of Independent Disks (RAID), or any other mass storage devices may be used.

Bus 902 communicatively couples processor(s) 904 with the other memory, storage and communications blocks. Bus 902 can be a PCI/PCI-X, SCSI, a Universal Serial Bus (USB) based system bus (or other) depending on the storage devices used, and the like. Removable storage media 910 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 906 is encoded with application(s) 922 that support(s) the functionality as discussed herein (the application(s) 922 may be an application(s) that provides some or all of the functionality of the services/mechanisms described herein. Application(s) 922 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 904 accesses main memory 906 via the use of bus 902 in order to launch, run, execute, interpret or otherwise perform the logic instructions of the application(s) 922. Execution of application(s) 922 produces processing functionality of the service related to the application(s). In other words, the process(es) 924 represent one or more portions of the application(s) 922 performing within or upon the processor(s) 904 in the computer system 900.

It should be noted that, in addition to the process(es) 924 that carries (carry) out operations as discussed herein, other embodiments herein include the application 922 itself (i.e., the un-executed or non-performing logic instructions and/or data). The application 922 may be stored on a computer readable medium (e.g., a repository) such as a disk or in an optical medium. According to other embodiments, the application 922 can also be stored in a memory type system such as in firmware, read only memory (ROM), or, as in this example, as executable code within the main memory 906 (e.g., within Random Access Memory or RAM). For example, application(s) 922 may also be stored in removable storage media 910, read-only memory 908, and/or mass storage device 912.

Those of ordinary skill in the art will understand that the computer system 900 can include other processes and/or software and hardware components, such as an operating system that controls allocation and use of hardware resources.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A submersible automated system for measuring cathodic protection potential of a structure, the system comprising:

a housing including a housing top and a housing bottom that define an inner volume, the housing adapted to be positioned entirely below grade;

the housing top including a removable top cap;

one or more topside electrical terminals mounted within the inner volume at the top of the housing beneath the removable top cap, the one or more topside electrical terminals not coupled to the removable top cap such that removal of the top cap does not cause movement of the one or more topside electrical terminals, the one or more topside electrical terminals unobstructed and electrically accessible from outside the inner volume directly above the one or more topside electrical terminals when the removable top cap is removed;

an electronic connection assembly configured within the inner volume;

an electronic measurement system configured within the inner volume;

one or more first electrical lines passing from outside the inner volume to inside the inner volume, the one or more first electrical lines configured to provide electrical voltages and/or electrical currents to the electronic connection assembly, the electrical voltages and/or the electrical currents indicating a cathodic protection potential of the structure, the electronic connection assembly configured to communicate the electrical voltages and/or the electrical currents to the electronic measurement system for measurement;

one or more second electrical lines passing from the electronic connection assembly to the one or more topside electrical terminals configured to communicate the electrical voltages and/or the electrical currents from the electronic connection assembly to the one or more topside electrical terminals;

a controller configured within the inner volume and adapted to receive signals from the electronic measurement system indicating the measured electrical voltages and/or electrical currents; and a communications system configured within the inner volume and adapted to receive information from the controller based at least in part on the signals received from the electronic measurement system, and to transmit at least some of the information.

2. The system of claim 1 wherein the communications system includes a satellite communications system.

3. The system of claim 2 wherein the communications system includes an antenna, the antenna removably mounted within the inner volume at the top of the housing beneath the removable top cap, the antenna not coupled to the removable top cap such that removal of the top cap does not cause movement of the antenna, the antenna unobstructed and accessible from outside the inner volume directly above the antenna when the removable top cap is removed.

4. The system of claim 1 wherein the housing is adapted to be configured within a below grade test box, the test box including a top ledge and the top of the housing including a rim adapted to rest on at least a portion of the top ledge.

5. The system of claim 1 further comprising a switching assembly configured within the inner volume and configured to selectively electrically communicate the electrical voltages and/or the electrical currents from the electronic connection assembly to the electronic measurement system.

6. The system of claim 5 wherein the controller selects the electrical voltages and/or the electrical currents to communicate to the electronic measurement system.

7. The system of claim 1 wherein the housing is airtight and watertight.

8. The method of claim 1 wherein the communications system includes a satellite communications system.

9. The method of claim 8 wherein the communications system includes an antenna, the antenna removably mounted within the inner volume at the top of the housing beneath the removable top cap, the antenna not coupled to the removable top cap such that removal of the top cap does not cause movement of the antenna, the antenna unobstructed and accessible from outside the inner volume directly above the antenna when the removable top cap is removed.

10. The method of claim 9 wherein the antenna includes a helix antenna.

11. The system of claim 3 wherein the antenna includes a helix antenna.

12. A method of automatically measuring cathodic protection potential of a structure, the method comprising:

(A) providing a housing adapted to be positioned entirely below grade, the housing including a housing top and a housing bottom defining an inner volume, the housing including a removable cap;

(B) providing one or more topside electrical terminals mounted within the inner volume at the top of the housing beneath the removable top cap, the one or more topside electrical terminals not coupled to the removable top cap such that removal of the top cap does not cause movement of the one or more topside electrical terminals, the one or more topside electrical terminals unobstructed and electrically accessible from outside the inner volume directly above the one or more topside electrical terminals when the removable top cap is removed;

(C) configuring an electronic connection assembly within the inner volume;

(D) configuring an electronic measurement system configured within the inner volume;

(E) placing the housing entirely below grade;

(F) providing one or more first electrical lines passing from outside the housing to inside the housing, the one or more first electrical lines configured to provide electrical voltages and/or electrical currents to the electronic connection assembly, the electrical voltages and/or the electrical currents indicating a cathodic protection potential of the structure, the electronic connection assembly configured to communicate the electrical voltages and/or the electrical currents to the electronic measurement system for measurement;

(G) providing one or more second electrical lines passing from the electronic connection assembly to the one or more topside electrical terminals configured to communicate the electrical voltages and/or the electrical currents from the electronic connection assembly to the one or more topside electrical terminals;

(H) configuring a controller within the inner volume and using the controller to trigger the electronic measurement system to measure at least some of the electrical voltages and/or electrical currents provided by the one or more wires;

(I) configuring a communication system within the inner volume and using the communications system to receive information from the controller based at least in part on the signals received from the electronic measurement system, and to transmit at least some of the information.

13. The method of claim 12 wherein the housing is adapted to be configured within a below grade test box, the test box including a top ledge and the top of the housing including a rim adapted to rest on at least a portion of the top ledge.

14. The method of claim 12 further comprising:

(G)(1) configuring a switching assembly within the housing to selectively electrically communicate the electrical voltages and/or the electrical currents from the electronic connection assembly to the electronic measurement system; and (G)(2) using the controller to select the electrical voltages and/or the electrical currents to communicate to the electronic measurement system.

15. The method of claim 12 wherein the housing is airtight and watertight.

* * * * *